Figure 1:
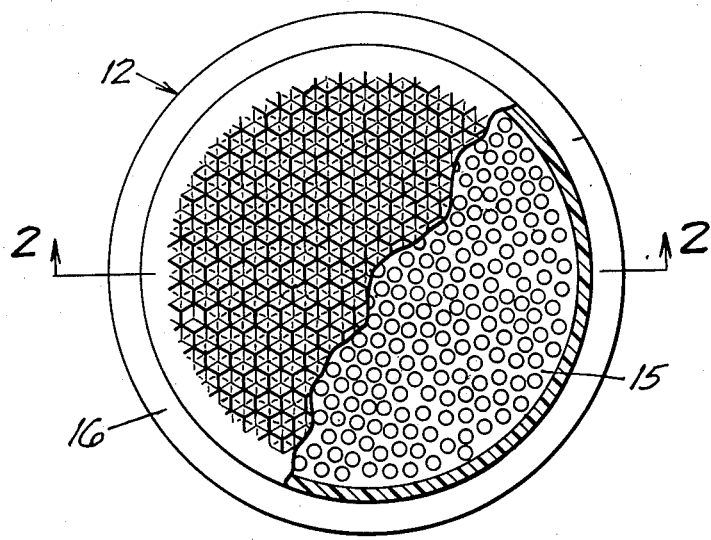

July 7, 1964  V. WEBER  3,140,340
REFLEX REFLECTOR ARTICLE
Filed March 1, 1961

INVENTOR
VICTOR WEBER
BY
Carpenter, Abbott, Coulter & Kinney
ATTORNEYS

United States Patent Office 3,140,340
Patented July 7, 1964

3,140,340
REFLEX REFLECTOR ARTICLE
Victor Weber, St. Paul, Minn., assignor to Minnesota Mining and Manufacturing Company, St. Paul, Minn., a corporation of Delaware
Filed Mar. 1, 1961, Ser. No. 94,112
4 Claims. (Cl. 88—82)

This is a continuation-in-part of my application Serial No. 52,608, filed August 29, 1960, now abandoned.

This invention relates to prismatic disk types of reflex light reflectors which cause an incident beam of light impinging thereon to be retro-directed back toward the direction of the light source itself, more or less in a brilliant cone having the incident beam as its axis. The returned light is spoken of as being retro-reflected or reflex-reflected; and the reflector is usually called a retro-reflector or reflex-reflector. These devices are embodied in highway signs, as safety markers on posts, trees, barriers and abutments, and as warning signals on vehicles, etc., and ought to have a high degree of visibility under nighttime driving conditions to the drivers of approaching vehicles whose headlamps illuminate the reflective disk or button.

The present invention provides new and improved retro-directive reflector disks which, because of their "angularity" and "divergency" characteristics, are highly visible under a greater variety of viewing conditions than are the devices of the prior art.

The design of known reflex-reflectors has been such that they have been either especially effective to cause high brilliancy of retro-reflection, or noteworthy spreading or diverging of retro-reflected light, or wide-angularity incident-light retro-reflection, etc. But the maximum achievement of brilliancy of reflex-reflected light has in the past meant that other design parameters must suffer to some extent. Specifically, maximum brilliancy of retro-reflected light is achieved by full reflection and by limiting the spreading of the retro-directed rays so that the cone of returned light is as close to being coextensive with the beam of the incident light as possible. In practice, this is achieved to maximum known extent by using prismatic reflex-reflectors, sometimes called cube-corner reflectors (e.g., as illustrated, for example, in Stimson U.S. Patent No. 2,022,639; also note introductory paragraphs of Chretien U.S. Patent Re. 19,070). While prismatic disk reflectors are extraordinarily effective to return an incident beam of light back toward its source, they suffer from several practical limitations. For example, the maximum angularity (i.e., deviation angle from normal) for incident light retro-reflection is limited for high brilliancy prismatic retro-reflectors. An incident beam striking at an angle of only a few degrees away from the axis of a prismatic reflective unit will pass through that unit without being reflected. Attempts to correct this deficiency of prismatic reflectors by staggering the axes of prisms (i.e., staggering the orientation of cube-corners) in the reflector have been successful to only a limited extent, and have served to introduce additional critical angularity problems, as well as somewhat reduce the brilliancy of reflex-reflection per unit of area from any one angle of incident light within the critical range for prismatic reflex-reflection.

In addition, the "divergency" characteristic of returned light or retro-directed light from a maximum brilliancy prismatic reflector is generally poor. Divergency is limited by the very nature of the critical requirements for high brilliancy prismatic reflex reflection. Small divergency for retro-directed rays limits the range at which prismatic reflectors, when mounted along the side of a highway, are effective to convey intelligence to the drivers of automobiles. The retro-directed rays of light, returning substantially along the path of the incident headlight beam from an automobile, fail to spread sufficiently from the incident beam so as to reach the eyes of the driver of the automobile at close ranges of about 50 or possibly 100 feet. In effect, maximum brilliancy prismatic reflectors are visible and gain the attention of the driver only under relatively long range viewing conditions. The disadvantage of limited angularity and limited divergency of returned light rays frequently outweighs the advantage of brilliant long-range reflex-reflection, particularly where a reflector is needed under conditions to give a driver "last-minute" as well as earlier warning information or intelligence, or where drivers may likely fail to see the reflector at a great distance either because of the distance or adverse weather conditions, and thus be oblivious to the intelligence to be conveyed by the reflector. In practical applications, therefore, the maximum attainable brilliancy for prismatic reflectors must be sacrificed if improved angularity and divergency characteristics are to be introduced into the prismatic reflectors.

The novel unitary combination of this invention provides a solution to the problem of maintaining maximum or very high reflective brilliancy as imparted by prismatic reflectors, and yet achieving desired wide-angularity and divergency characteristics so that a combination of long-range brilliantly-reflective early warning as well as a last-minute "attention-getting" warning for automobile drivers is possible. No artificial power at the location of delineator disks hereof is needed (although such may be used); thus, the reliability of the warning system is not dependent upon such artificial power.

The invention provides prismatic reflex light reflector disks which exhibit the high brilliancy needed for long-range advance warning to motorists traveling at high speeds along super highways. At the same time, they are of such character as to exhibit adequate wide angularity and divergency of reflex-reflection beyond those critical angles previously associated with maximum or even very high brilliancy prismatic reflex-reflector disks. Thus my reflecting marker is called to the attention of drivers at relatively close (but angular) range in the event the desired long-range advance warning was missed or not clearly understood at the distance involved. As a practical matter, there is no blacking out of visibility of vertically mounted head-on warning delineators of this invention as the driver approaches.

Figure 2:
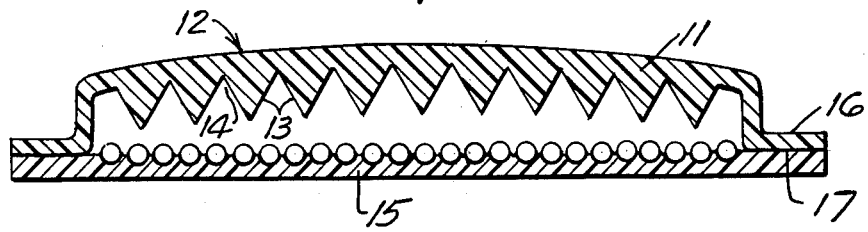

The invention will be further described by reference to a drawing, made a part hereof, wherein:

FIGURE 1 is a graphic top plan view of a preferred embodiment of my device, partially broken away; and FIGURE 2 is a schematic cross section taken on lines 2—2 of FIGURE 1.

The unitary device of the invention comprises a molded transparent prismatic disk or plate 11 having a smooth front face or exposed surface 12 and a multiplicity of contiguous prismatic "cube-corner" retro-reflecting units 13 disposed on the rear surface thereof and contacted by an air gap 14 which provides a prism-air interface, there being no silvering or other reflective coating on the plate. A reflex-reflecting beaded sheet material 15 is disposed in spaced relationship to the back of the prismatic plate and is suitably sealed to peripheral flanged edge portions 16 of the plate, which edge portions lie in a plane below the points or vertexes of the cube-corners, by a hermetic seal 17 so as to provide a sealed unitary structure and preclude entry of dust and moisture which otherwise would gradually interfere with the optical performance of the device, as by contaminating the prism-air interface.

It is particularly important to maintain the cube-corner retro-reflecting units 13 as well as the reflex-reflecting surface of the beaded reflector sheet 15 within a hermetically sealed chamber so as to protect against dust and moisture contamination. While this is suitably accomplished by sealing the beaded sheet 15 to the peripheral portions of the transparent plate 11, as illustrated, it may also be accomplished using other expedients well known in the art. For example, protection of the retro-reflecting units of the plate and the reflex-reflecting surface of the sheet material within a hermetic chamber may be accomplished by simply employing a separate backing member (e.g., plastic or metal; transparent or opaque; etc.) to which peripheral portions of the transparent plate are hermetically sealed, with the reflex-reflecting sheet loosely disposed between the separate backing member and the transparent prism plate within the hermetic chamber (or possibly with the reflex-reflecting sheet tacked to the separate backing member here discussed). A variety of other means for hermetic protection will readily occur to those skilled in the art.

A suitable structure for the prismatic transparent cube-corner plate member is described in Stimson U.S. Patent No. 2,022,639; and for the sake of brevity, the disclosure of that patent is here incorporated by reference. The front face of this transparent plate member may be flat or slightly convex (or even have localized concave or convex lens portions).

Each prismatic reflecting unit at the back of the transparent plate has three polished flat and mutually perpendicular surfaces, forming what is often referred to as a "cube-corner," the axis through the point or vertex of which is perpendicular to the plane of the plate and extends outwardly from the vertex equidistantly from all three surfaces of the "cube-corner." A beam of incident light entering the front face of the plate at a small angle from the perpendicular (e.g., usually no more than about three degrees for plates having all cube-corners oriented for maximum head-on reflection) strikes the cube-corner surfaces and is internally reflected from surface to surface so as to emerge and return toward its source, thus being retro-directively reflected. Light rays incident to the front surface of the plate at angles greater than the small critical angle are not efficiently reflected, or are not reflected at all, since some or all of the light passes completely through prism-air interfaces at the back and escapes. This effect is well known to the art and needs no detailed explanation.

I have discovered that greatly improved angularity and divergency characteristics are obtained when a flat wide-angle type of beaded reflex-reflector is used in combination with said cube-corner plate as a parallel back reflector spaced from the plate with an intervening air gap. It has been found that light rays escaping through the plate are reflected from this type of back reflector in such a way that they are efficiently transmitted back through the plate toward the source of light so as to thereby improve the angularity and divergency characteristics of the device.

The spacing of the beaded reflex-reflector sheet from the cube-corner units of the transparent plate is an optical matter and structurally may vary widely. Sufficient spacing to provide a prism-air interface for the cube-corner units is required. Since the surface presented by the cube-corner units is jagged, satisfactory optical spacing is realized even when the beaded reflex-reflector sheet is loosely placed immediately behind the cube-corner units, with some minute points of contact between fractions of the two surfaces being possible without upsetting the necessary optical relationship.

Examples of several suitable wide-angle beaded reflex-reflectors for mounting in spaced relationship from the transparent plate are illustrated in Gebhard et al. U.S. Patent No. 2,326,634. Reflex-reflectors of the type having an exposed layer of minute transparent glass beads of refractive index ($n_D$) of approximately 1.9, partially embedded in a binder layer, with a specular mirror-like metallic coating or plating on the back of each bead, give the highest efficiency and brilliancy for the present device. The high efficiency or brilliancy of wide-angle reflection thereby obtained is about 50% above that attained where the beaded reflex-reflector element employs a non-specular or semi-specular pigmented reflective material behind the beads, although significant improvement is gained even when pigmented reflective material is employed behind the beads. The use of specular metallic cap reflectors about the underlying portions of the small glass beads is thus of critical importance where maximum wide-angle brilliancy for the disks hereof is to be realized. Also, the use of specular metallic cap reflectors about underlying portions of small glass beads allows for gaining light-transmission properties through the beaded reflex-reflector sheet, since a transparent binder may be used as the base layer to hold the beaded reflex-reflector complexes in position in the sheet.

While beads of approximately 1.9 refractive index are preferred in the beaded sheet material, beads in the refractive index range of about 1.7 to 2.0 may be employed; and beads of even higher refractive index may be useful in special beaded sheet materials so long as the wide-angularity high-brilliancy requirements for the beaded reflex-reflector are maintained. Useful beads for the beaded reflex-reflector may vary in diameter from about 15 microns up to about 250 microns, those of 25 to 75 microns diameter being preferred for maximum uniformity and brilliancy of wide angle reflection.

Light-transmitting beaded reflector sheets (e.g., comprising reflex-reflecting complexes of beads and underlying reflective means held in optical orientation for front reflex reflection by a light-transmitting binder layer, with the sheet transmissive to at least 5% and up to about 50%, or possibly more, of the light directed upon its rear surface) may be particularly useful in the composite structure hereof as where, for example, the structure is to be used as a lens element in a taillight assembly to provide brilliant cube-corner retro-reflection as well as wide-angle reflex reflection in the event artificial illumination behind the structure should fail. Even in the absence of artificial illumination failure, reflex-reflected light would serve to augment that from the artificial source transmitted through the structure.

Beaded reflector sheets may also be formed by coating special compositions on the interior of a back plate for the composite article hereof. Such compositions are well known and give, on drying, the beaded reflex-reflector characteristic. Where hemispherically reflectorized beads are dispersed in such compositions, the resulting dried layer contains randomly oriented reflex-reflecting complexes of beads and associated reflectors, with sufficient of the complexes in optical orientation to reflex-reflect incident light on the front face. Preferably, however, sheet materials of the general type illustrated in the following example are employed.

The following is offered as a specific illustrative example of a device prepared according to the invention. A three-inch diameter transparent plate made from methyl methacrylate, having a slightly convex but substantially flat front face (i.e., only slightly arced as illustrated in FIGURE 2) and having rear prismatic reflectors as described in Stimson U.S. Patent No. 2,022,639, was hermetically sealed along peripheral flange portions to a beaded reflex-reflector sheet consisting essentially of a layer of small glass beads of 1.9 refractive index partially embedded in a methyl methacrylate binder layer, the beads being silvered on the back.

The axes of the cube-corners or prisms of the plate were substantially parallel and perpendicular to the front face of that plate. Each of the three surfaces or planes of the prisms was about 1/16 inch square was about 100 cube-corners or prisms being located in each square inch of the plate. Also, the prisms were oriented in substantially parallel rows, with each surface of each prism substantially parallel with its respective counterpart in adjacent prisms. A compact pattern was formed by the prisms so as to provide a series of visually-apparent aligned hexagonal apertures when viewed through the front face of the plate. (Alternatively, however, if desired, random orientation of prisms on the back surface of the plate may be used, and advantageously results in greater angularity for prismatic reflex reflection with, of course, some decrease in brilliance.)

As the wide-angle beaded reflex reflector for this specific example, I employed a structure consisting of a monolayer of glass beads of 1.9 refractive index and 40–70 microns diameter partially embedded in a binder layer of methyl methacrylate, with silver hemispherical reflector caps about the embedded portion of the glass beads. To lend toughness to this structure without substantially detracting from flexibility, I used a thin backing film (i.e., 12 mils thick) of rubber-modified methyl methacrylate (e.g., a polymerization product of methyl methacrylate and acrylonitrile with an emulsion of butadiene-styrene copolymer as described in U.S. Patent No. 2,857,360). Formation of a beaded reflex reflector having this structure is conveniently accomplished by coating a solvent-diluted solution of methyl methacrylate (e.g., 30% solids in cellosolve acetate) at about 3 mils thickness on the backing film, partially evaporating the solvent to form a solvent, tackified coating, pressing previously silvered glass beads of the specified character into the tacky coating up to about half their diameter, further drying the coating to rid it of solvent, and then etching exposed silver from the beads. Etching is suitably accomplished by about 10 seconds exposure to a solution consisting of 2.7 parts sulfuric acid, 0.8 part acid potassium dichromate, and 96.5 parts water. After etching, the structure is rinsed and dried. Other materials may, of course, be employed to form the beaded reflector, as is now well known in this art, and the foregoing is to be construed only as illustrative.

The hermetic seal between the parts of this specific example was formed by cementing the beaded sheet material to the peripheral flanged portions of the plate. Specifically, the flanged edge portions of the plate were coated with a film of a fluid composition consisting of 60 parts methylene dichloride, 30 parts methyl methacrylate monomer, 10 parts methyl methacrylate polymer, and 1.0 part of a 50/50 mixture of benzoyl peroxide and camphor. Then the beaded reflector sheet, beaded side toward the flange of the plate, was pressed into contact and the structure allowed to cure at room temperature for about 12 hours. Other means of effecting a hermetic seal, such as for example, heat sealing, may be used, if desired.

The resulting delineator gave brilliant prismatic reflection of incident light striking its front face at any incident angle within a few degrees from normal (i.e., where prismatic reflex reflection predominates). Beyond the critical angles for prismatic reflection, this delineator continued to reflex reflect incident light. Surprisingly, it also reflex reflected incident light striking its front surface at angles as high as about 89° from normal (i.e., almost parallel with its front face). The exact mechanism by which the delineator reflexively reflects incident light almost parallel with its front face is apparently extremely complex. Analysis of the optics at first blush would suggest that reflex reflection at such an angle would be impossible in view of the phenomenon of surface reflectivity to be expected; yet the empirical fact is that such reflex reflection at high angularity is achieved. Without purporting to outline a complete explanation, it is postulated that incident light which actually passes into the transparent plate at high incident angles after being broken down into small beams, and multiply refracted and reflected within the delineator, and reflexively reflected by the beaded back reflector, is substantially fully returned with good divergency toward the source of the incident light. Indeed, the intensity or brilliance of such extremely high angularity reflex reflection for my composite delineator is surprisingly greater than that for a beaded reflex reflector alone, even though the latter is of the same kind as that used in the composite delineator. Thus, contrary to expectation, the prismatic unit enhances rather than obscures or handicaps extremely high angularity of reflex reflection by beaded reflectors, with the result of an unexpected high angularity of reflex reflection for the composite, even higher than that associated with beaded reflectors alone.

The unexpected property of reflex reflection of incident light near parallel to the front surface of the plate of my disk varies depending upon the character of the plate member and the radial angle at which incident light beams are directed to the plate. At a few radial angles about the plate of the specific delineator of the foregoing example (where parallel rows of oriented prisms are employed), almost parallel incident light will not be reflex reflected. These radial angles are limited, for the delineator of the foregoing specific example, to three different locations about the disk, spaced 120° apart. The three locations are defined by the surfaces of the oriented cube-corner prismatic units themselves. The locations coincide with radial locations where that single surface of each solid cube-corner unit nearest an incident beam is substantially transverse to the incident beam. Stated another way, these three "black out" locations for extremely high angularity incident light (e.g., incident angles above about 75–80°) coincide with radial locations about a horizontally disposed disk of the foregoing example where a flat surface of each solid cube-corner unit is oriented toward the near parallel incident beam, so that a vertical plane through the incident beam intersects perpendicularly those flat faces or surfaces of cube-corner units through which it passes. Visually, the radial locations (each extending for only two or three radial degrees) about the disk where "black out" of near parallel incident light occurs may be predicted by viewing the front face of the disk at an angle of about 75–80°, then rotating the disk in its plane until one sees an apparent pattern of parallel transverse and longitudinal lines which form a multitude of apparent squares in the plate. At this point, checking will reveal that one surface of each cube-corner of the delineator of the foregoing specific example is substantially transverse to the line of sight from the viewer and that each such surface of each cube-corner is the one located nearest the viewer.

Directly across the disk from each "black out" radial location (i.e., at 180° from each "black out" location) the disk of the foregoing example exhibits maximum brilliancy of reflex-reflection for near-parallel incident light. There are three such locations spaced radially about the disk intermediate the radial locations of "black out" for near parallel incident light. Between these extremes (i.e., between each "black out" location and adjacent radial location for maximum brilliancy of near-parallel reflex reflection) there is a gradual change of near-parallel reflex reflectivity toward the extremes.

It is, accordingly, possible to orient a delineator of the foregoing example in horizontal position on a center island between lanes of traffic so that traffic control intelligence will be conveyed to drivers of vehicles approaching from one direction (i.e., by near-parallel reflex reflection), without at the same time disturbing or distracting drivers approaching from an opposite direction. To accomplish this, one simply orients the disks so that the radial angle of sighting for drivers approaching in the direction not to be alerted will substantially coincide with a "black out" angle of the disk.

While the reflex-reflecting delineators hereof will have utility in a variety of applications, their behavior characteristics, when used as a marker to convey information to drivers of fast moving automobiles on super highways, are considered particularly significant, inasmuch as nothing heretofore available has remotely approximated the performance characteristics of this device. As the driver of a fast moving automobile approaches a marker formed of a device or plurality of devices of the type taught herein, he is first placed on notice as to the existence of the marker by virtue of the brilliant but highly critical conditions of reflex reflection occurring at the prismatic-air interface of the structure. An incident beam of light from an automobile headlight is returned toward the automobile and the very small angle of divergence for this brilliant returned light is at least sufficient, under distant viewing conditions, for some of the light to be within the field of vision of the driver. Where the intelligence marking on the sign or marker is large, complete information necessary for prudent action by the driver is conveyed to him, under ideal weather conditions, at this early stage when attention is called to the existence of the marker.

But assuming that the driver is distracted within the next few seconds of driving, or that weather conditions are adverse, intelligence from the marker is still conveyed to the driver at closer range by the attention-getting quality of retro-directed wide angle incident light. Contrary to what might be expected by placing a transparent prismatic reflector in front of a beaded reflector sheet, and even though a jangled pattern of angled incident light going in a multitude of directions finally reaches the beaded underlying reflector through the transparent front plate, the underlying reflector performs its reflex-reflecting function substantially returning each segment or fraction of incident light received thereon back toward separate surfaces of the prismatic transparent plate and then ultimately through that plate to the driver of the automobile, effectively causing the sign or marker to appear especially lighted to the driver of the automobile.

That which is claimed is:

1. A brilliantly-reflective, wide-angularity, reflex-reflecting device comprising a plate of transparent material having a plurality of cube-corner retro-reflecting units disposed on the rear surface thereof, and an underlying high brilliancy wide-angle beaded reflex-reflector sheet in such spaced relation from said retro-reflecting units that wide angularity light transmitted through said plate of transparent material upon said underlying sheet is largely reflex-reflected by said sheet and transmitted back through said plate substantially toward the source of said light, the peripheral edge portions of said plate and sheet being hermetically sealed.

2. A reflex-reflecting device comprising a plate of transparent material and a wide-angle beaded back reflex-reflector sheet spaced from said plate and hermetically sealed thereto along peripheral meeting portions, the transparent plate material having disposed on the internal surface thereof a plurality of cube-corner retro-reflecting units, each being exposed to an air interface within the cavity of the hermetic seal, and the back reflex-reflector sheet comprising small glass beads with associated underlying specular reflective means, said spacing of said back reflex-reflector sheet from said plate of transparent material being such that wide angularity light transmitted through said plate upon said sheet is largely reflex-reflected by said sheet and transmitted back through said plate substantially toward the source of said light.

3. A brilliantly-reflective, wide-angularity, reflex-reflecting device comprising a plate of transparent material having a plurality of cube-corner retro-reflecting units disposed on the rear surface thereof, and an underlying high brilliancy wide-angle beaded reflex-reflecting sheet in spaced relation from said retro-reflecting units with its reflex-reflecting surface disposed toward said retro-reflecting units, the spacing of said beaded reflex-reflecting sheet from said plate of transparent material being such that wide angularity light transmitted through said plate upon said sheet is largely reflex-reflected by said sheet and transmitted back through said plate substantially toward the source of said light, said retro-reflecting units and said reflex-reflecting surface of said beaded reflex-reflector sheet being enclosed within a hermetically sealed chamber.

4. A reflex-reflecting device which is also light transmitting comprising a plate of transparent material with cube-corner retro-reflecting units disposed on the rear surface thereof, and a wide-angle beaded back reflex-reflector sheet underlying said plate with its reflex-reflecting surface disposed toward the retro-reflecting units of said plate and in spaced relationship therefrom, said back reflex-reflector sheet comprising small glass beads with associated underlying specular reflective means and a light-transmitting binder layer holding said glass beads and associated reflective means in optical orientation for reflex reflection of light directed upon the reflex-reflecting surface of said sheet, the retro-reflecting units and the reflex-reflecting surface of said beaded reflex-reflector sheet being enclosed within a hermetically sealed chamber protecting the same against dust and moisture contamination.

References Cited in the file of this patent

UNITED STATES PATENTS

| | | |
|---|---|---|
| 2,354,048 | Palmquist | July 18, 1944 |
| 2,432,810 | Ryder | Dec. 16, 1947 |
| 2,948,191 | Hodgson et al. | Aug. 9, 1960 |